United States Patent [19]

Kleintjens

[11] Patent Number: 4,725,667

[45] Date of Patent: Feb. 16, 1988

[54] PROCESS FOR PURIFYING A RUBBER

[75] Inventor: Ludovicus A. L. Kleintjens, Stein, Netherlands

[73] Assignee: Stamicarbon B.V., Geleen, Netherlands

[21] Appl. No.: 848,828

[22] Filed: Apr. 7, 1986

Related U.S. Application Data

[63] Continuation of Ser. No. 671,307, Nov. 14, 1984, abandoned.

[30] Foreign Application Priority Data

Nov. 17, 1983 [NL] Netherlands ................... 8303942

[51] Int. Cl.$^4$ .............................. C08F 6/00; C08F 6/24
[52] U.S. Cl. .................................... 528/483; 528/490; 528/498; 528/503; 210/774
[58] Field of Search ............... 528/483, 503, 490, 498; 210/774

[56] References Cited

U.S. PATENT DOCUMENTS

| | | | |
|---|---|---|---|
| 2,953,557 | 9/1960 | Wride et al. | 528/483 X |
| 3,378,467 | 4/1968 | Colton et al. | 528/483 X |
| 4,061,566 | 12/1977 | Modell | 528/483 X |
| 4,695,621 | 9/1987 | Allada | 528/483 |

FOREIGN PATENT DOCUMENTS 1272778  5/1972  United Kingdom ............... 528/483

OTHER PUBLICATIONS

Translation of German Offen. No. 3,323,940 to Braun et al., laid open Jan. 1, 1985.

Billmeyer, "Textbook of Polymer Science", Wiley—Interscience, N.Y. (1971) pp. 235–236.

*Primary Examiner*—Joseph L. Schofer
*Assistant Examiner*—F. M. Teskin
*Attorney, Agent, or Firm*—Carl G. Love

[57] ABSTRACT

The invention relates to a process for purifying ethylene-alkene-diene rubbers by extraction with an extractant chosen from substances with a critical temperature below 435° K. at a temperature above the critical temperature of the extractant and a pressure above the critical pressure of the extractant.

8 Claims, No Drawings

PROCESS FOR PURIFYING A RUBBER

This is a continuation of application Ser. No. 671,307, filed Nov. 14, 1984, now abandoned.

The invention relates to a process for purifying a rubber built up of at least ethylene groups, alkene-1 groups with 3-8 C atoms per group and diene groups. Here ethylene groups are understood to mean groups in the polymer formed by the incorporation of ethylene through polymerization, alkene-1 groups, groups in the polymer formed by the incorporation, through polymerization, of one or more alkenes-1 having 3-8 C atoms per group and diene groups, groups in the polymer formed by incorporation of one or more dienes through polymerization. In the text hereinafter and in the claims this ethylene-alkene-diene rubber is usually referred to as EADM rubber for short. The invention particularly relates to a process for purifying an ethylene-propylene diene rubber (EPDM rubber).

Such an EADM rubber is prepared by polymerizing ethylene, one or more alkenes-1 having 3-8 C atoms per molecule, specifically propylene, and one or more dienes, for instance cyclopentadiene, dicyclopentadiene, 1,4-hexadiene, 5-ethylidenenorbornene-2, 5-vinylnorbornene-2 and the like, usually in an organic solvent, for instance special boiling point spirit, upon which the polymer formed is usually separated off and cleared of catalyst by bringing the organic solution of it into water. A suitable process is given in the U.S. Pat. No. 3,350,370, the contents of which are referred to here just for the sake of brevity. After the polymerization described therein, the EPDM rubber formed in that case will be available in the form of a moist crumb with a particle size of, for instance, 2-5 mm. This crumb still contains a large amount of impurities, for instance monomer residues, particularly diene residues, other organic impurities, for instance the solvent in which the polymerization took place, and an amount of water. The pure EADM rubber contains at least 90 % (wt) of ethylene groups, alkene-1 groups with 3-8 C atoms per group and diene groups in a weight ratio between the ethylene groups, the alkene-1 groups and the diene groups of respectively 1: (0.15-3): (0.005-0.6).

The water present in the crumb can be removed fairly easily by applying various well-known drying techniques. However, the removal of the organic impurities to the desired low level of less than 0.2 % (wt) in respect of the total weight of the pure EADM rubber causes great problems.

In the said U.S. Pat. No. 3,350,370 it is proposed to purify the crumb from these organic impurities by bringing the crumb into aqueous suspension and subsequently treating it with steam. The result of this process, however, is insufficient.

The present invention provides a very simple and yet effective solution for these purification problems. According to the invention a process for purifying a rubber consisting of at least groups derived from ethylene, from alkene-1 having 3-8 C atoms per group and from diene is characterized in that, per kg impurities in the rubber, the rubber is treated with at least 20 Nm$^3$ (NPT) of an extractant chosen from substances the critical temperatures of which are lower than 435 K, at a temperature above the critical temperature of the extractant and a pressure above the critical pressure of the extractant. Nm$^3$ (NPT) is understood here and hereinafter and in the claims to mean the amount in m$^3$ of the relative substance measured at a pressure of 1 bar and a temperature of 273 K. Suitable examples of these substances are $SO_2$, $N_2O$, $NO_2$, $NO$, $CO$, $CH_4$, $N_2$, $CO_2$, ethylene and propylene and mixtures of these components and/or of these components with less than 50% (vol) other components, which mixtures must have a critical temperature lower than 435 K. Of these examples preference is given to $CO_2$, ethylene and propylene and mixtures of two or of all three of these components. $CO_2$ is a very effective extractant, which is very cheap. Ethylene is always available in an EADM rubber plant and has the additional advantage that, after having been used as extractant, optionally followed by purification, it can be used as monomer in the production of the EADM rubber. For an EPDM plant propylene has the same advantages as ethylene. Critical temperature and critical pressure are understood here to mean the temperature and the pressure going with the gas-liquid critical point.

It is an advantage, before applying the process according to the invention to the rubber to be purified, to separate this rubber in the manner known to the person skilled in the art from the bulk of the water present, preferably to a water content lower than 5% (wt) in respect of the pure rubber. Effective processes for removing this water are filtration, filter-pressing, centrifugation and/or evaporation.

A very suitable duration of the treatment using the extractant is between 1 minute and 5 hours. In general a shorter period of treatment results in too low a degree of purification, a longer period of treatment is possible, but does not result in an appreciably better degree of purification. The optimum duration of the treatment is determined by the concentration of the impurities in the rubber, and the desired final value thereof, the intensity of contacting the rubber with the extractant and the temperature as well the rubber particle dimensions.

A very suitable temperature for the treatment using the extractant is between the critical temperature of the extractant and 600 K, preferably between 300 and 470 K.

A very suitable pressure for the treatment using the extractant is between the critical pressure of the extractant and, for practical reasons only, such as high costs of extreme pressure equipment, 10 times the critical pressure of the extractant, preferably between 100 and 500 bar.

A very suitable quantity of extractant per kg impurities in the EADM rubber to be purified is between 40 and 1500 Nm$^3$ (NPT). A smaller quantity of extractant results in general in too low a degree of purification and a larger quantity only results in an increase of costs and not in an appreciably better degree of purification.

From the European Patent application Nos. 68146 and 71793 it is known to remove odorous materials from crystalline ethylene and propylene containing polymers respectively by treatment of the finely dispersed polymer material under mild conditions and temperatures, at least 10° C. below the crystallization temperature, with a medium that removes odorous materials. In contrast to these crystalline polymers EADM-rubbers are amorphous materials with a very different behaviour with respect to the diffusion of organic impurities in the material, and swelling in the presence of extractant. From these patent application nothing can be inferred with respect to the removal of large quantities of organic impurities from amorphous EADM-rubber. For this reason is it surprising to observe the effective removal of impurities from EADM rubbers as demonstrated in the examples.

In order to realize a very good degree of purification in an economic manner it is an advantage to operate at a temperature above the critical temperature and at a pressure above the critical pressure.

The process of the invention is further elucidated by means of the following non-limitative examples and comparative experiments.

EXAMPLE I

Into an autoclave of 50 cm$^3$ 13.46 g EPDM crumb with a number-average particle size of about 3 mm is introduced. In addition to 1.20% (wt) water, this crumb contains organic impurities consisting of 0.61% (wt) $C_6$ compounds and 1.32% (wt) diene monomer.

For 30 minutes $CO_2$ is passed through this crumb at a rate of 0.600 Nm$^3$ (NPT) per hour at a pressure of 200 bar and a temperature of 333 K.

After the extractive treatment the remaining EPDM crumb is analyzed again. The organic impurities now contained in it amount to only less than 0.01 (wt) $C_6$ compounds and 0.01% (wt) diene monomer.

EXAMPLE II

Into an autoclave of 50 cm$^3$ 16.89 g of the same EPDM crumb as in example I is introduced.

For 15 minutes $CO_2$ is passed through this crumb at a rate of 0.560 Nm$^3$ (NPT) per hour at a pressure of 200 bar and a temperature of 333 K.

After this extractive treatment the remaining EPDM crumb is analyzed again. The organic impurities it now contains amount to only less that 0.01% (wt) $C_6$ compounds and 0.03% (wt) diene monomer.

EXAMPLE III

Into an autoclave of 50 cm$^3$ 13.66 g of the same EPDM crumb as in example I is introduced.

For 30 minutes $CO_2$ is passed through this crumb at a rate of 0.594 Nm$^3$ (NPT) per hour at a pressure of 150 bar and a temperature of 313 K.

After the extractive treatment the remaining EPDM crumb is analyzed again. The organic impurities it now contains amount to only less than 0.01 (wt) $C_6$ compounds and 0.04% (wt) diene monomer.

EXAMPLE IV

Into an autoclave of 50 cm$^3$ 17.12 g of the same EPDM crumb as in example I is introduced.

For 15 minutes $CO_2$ is passed through this crumb at a rate of 0.596 Nm$^3$ (NPT) per hour at a pressure of 150 bar and a temperature of 313 K.

After this extractive treatment the remaining EPDM crumb is analyzed again. The organic impurities it now contains amount to even less than 0.01% (wt) $C_6$ compounds and 0.15% (wt) diene monomer.

EXAMPLE V

Into an autoclave of 50 cm$^3$ 16.83 g of the same EPDM crumb as in example I is introduced.

For 15 minutes $CO_2$ is passed through this crumb at a rate of 0.648 Nm$^3$ (NPT) per hour at a pressure of 200 bar and a temperature of 308 K.

After the extractive treatment the remaining EPDM crumb is analyzed again. The organic impurities it now contains amount to less than 0.01 (wt) $C_6$ compounds and 0.13% (wt) diene monomer.

EXAMPLE VI

Into an autoclave of 50 cm$^3$ 20.03 g EPDM crumb with a number average particle size of about 3 mm is introduced. In addition to 27% (wt) water, this crumb contains organic impurities consisting of 4.6% (wt) $C_6$ compounds and 0.98% (wt) diene monomer.

For 3,5 hours $CO_2$ is passed through this crumb at a rate of 0.534 Nm$^3$ (NPT) per hour at a pressure of 200 bar and a temperature of 333 K.

After this extractive treatment the remaining EPDM crumb is analyzed again. The organic impurities now contained in it amount to only 0.03% (wt) $C_6$ compounds and 0.03% (wt) diene monomer.

EXAMPLE VII

Into an autoclave of 50 cm$^3$ 20.04 g EPDM crumb with a number average particle size of about 3 mm is introduced. In addition to 27% (wt) water, this crumb contains organic impurities consisting of 4.1% (wt) $C_6$ compounds and 0.98% (wt) diene monomer.

For 2 hours $CO_2$ is passed through this crumb at a rate of 0.533 Nm$^3$ (NPT) per hour at a pressure of 200 bar and a temperature of 333 K.

After the extractive treatment the remaining EPDM crumb is analyzed again. The organic impurities now contained in it amount to only 0.02% (wt) $C_6$ compounds and 0.03% (wt) diene monomer.

EXAMPLE VIII

Into an autoclave of 50 cm$^3$ 20.13 g EPDM crumb is introduced. In addition to 26% (wt) water, this crumb contains organic impurities consisting of 4.4% (wt) $C_6$ compounds and 1.14% (wt) diene monomer.

For 1 hour $CO_2$ is passed through this crumb at a rate of 0.461 Nm$^3$ (NPT) per hour at a pressure of 200 bar and a temperature of 333 K.

After this extractive treatment the remaining EPDM crumb is analyzed again. The organic impurities now contained in it amount to only 0.07% (wt) $C_6$ compounds and 0.11% (wt) diene monomer.

EXAMPLE IX

Into an autoclave of 50 cm$^3$ 15.72 g of the same EPDM crumb as in example I is introduced.

For 15 minutes ethylene is passed through this crumb at a rate of 0.603 Nm$^3$ (NPT) per hour at a pressure of 200 bar and a temperature of 313 K.

After the extractive treatment the remaining EPDM crumb is analyzed again. The organic impurities now contained in it amount to only less than 0.001% (wt) $C_6$-compounds and 0.09% (wt) diene monomer.

EXAMPLE X

Into an autoclave of 50 cm$^3$ 29.67 g EPDM crumb with a number-average particle size of about 3 mm is introduced. In addition to 29% (wt) water, this crumb contains organic impurities consisting of 5.3% (wt) $C_6$ compounds and 0.94% (wt) diene monomer.

For 30 minutes $CO_2$ is passed through this crumb at a rate of 0.536 Nm$^3$ (NPT) per hour at a pressure of 200 bar and a temperature of 333 K.

After the extractive treatment the remaining EPDM crumb is analyzed again. The organic impurities now contained in it amount to 2.1% (wt) $C_6$ compounds and 0.57% (wt) diene monomer.

EXAMPLE XI

Into an autoclave of 50 cm$^3$ 30.03 g EPDM crumb with a number-average particle size of about 3 mm is introduced. In addition to 28% (wt) water, this crumb contains organic impurities consisting of 5.5% (wt) C$_6$ compounds and 1.08% (wt) diene monomer.

For 30 minutes CO$_2$ is passed through this crumb at a rate of 0.502 Nm$^3$ (NPT) per hour at a pressure of 200 bar and a temperature of 333 K.

After the extractive treatment the remaining EPDM crumb is analyzed again. The organic impurities now contained in it amount to 1.9% (wt) C$_6$ compounds and 0.58% (wt) diene monomer.

What is claimed is:

1. A process for purifying an amorphous EADM rubber essentially composed of a copolymer of ethylene, an alkene-1 having from 3 to 8 carbon atoms, and a diene, and containing organic impurities, including diene monomer, and an amount of water, which are present therein from the process of the formation of the EADM rubber, which process comprises treating said rubber with an extractant under conditions of temperature and pressure which are respectively above the critical temperature and the critical pressure of said extractant, wherein said extractant has a critical temperature below 435° K., and wherein from 40 to 1500 Nm$^2$ (NPT) of said extractant are used per kilogram of the water plus said organic impurities content of said rubber.

2. Process according to claim 1, wherein before the treatment with the said extractant, the rubber to be purified is freed from water to a water content lower than 5% (wt) in respect of the rubber.

3. Process according to claim 1, wherein the treatment with the extractant is made to last 1 minute–5 hours.

4. Process according to claim 1, wherein the treatment with the extractant is effected at a temperature between the critical temperature of the extractant and 600 K.

5. Process according to claim 1, wherein the treatment with the extractant is effected at a pressure between the critical pressure and 10 times the critical pressure of the extractant.

6. Process according to claim 1, wherein the extractant used is CO$_2$, ethylene, propylene or a mixture of two or all three of these components.

7. Process according to claim 6, wherein the extractant used is CO$_2$.

8. Process according to claim 6, wherein the extractant used is ethylene, propylene or a mixture of these two components.

* * * * *